March 7, 1967 P. F. WALKER ETAL 3,307,723
BULK HANDLING
Filed Jan. 18, 1965 2 Sheets-Sheet 1
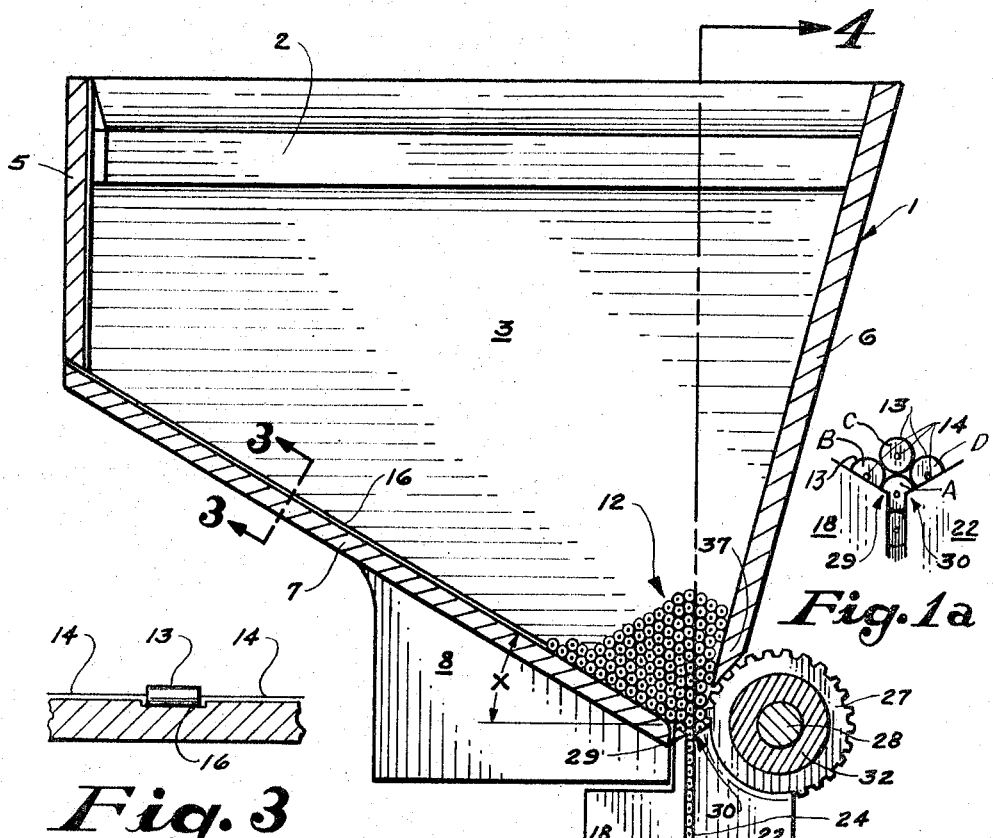
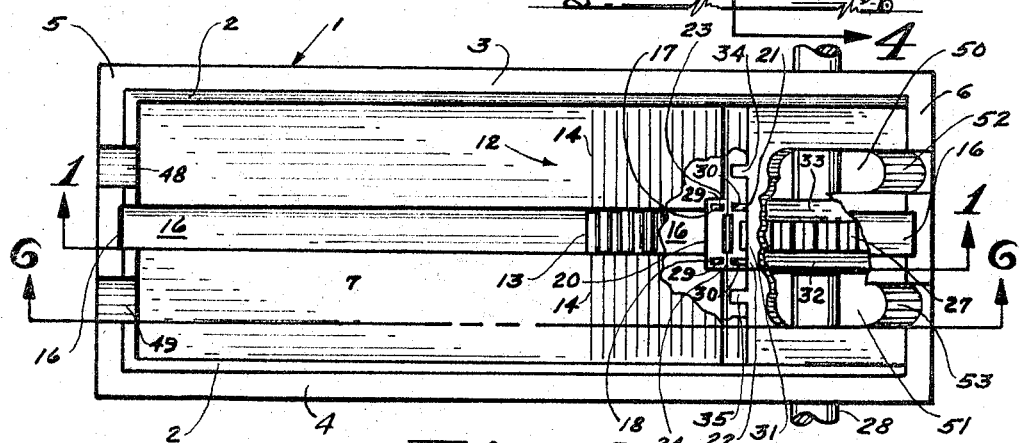
INVENTORS
PHILLIP F. WALKER
CARL M. BATCHA
HELMUT F. WEISSER
BY
Richard C. Stemmy Jr.

INVENTORS
PHILLIP F. WALKER
BY CARL M. BATCHA
HELMUT F. WEISSER

United States Patent Office 3,307,723
Patented Mar. 7, 1967

3,307,723
BULK HANDLING
Philip F. Walker, Wauwatosa, and Carl M. Batcha and Helmut F. Wiesser, Milwaukee, Wis., assignors to Allen-Bradley Company, Milwaukee, Wis., a corporation of Wisconsin
Filed Jan. 18, 1965, Ser. No. 433,828
7 Claims. (Cl. 214—302)

This invention pertains to the handling of cylindrical bodies, such as electronic components; and more specifically, the handling of such bodies in a bulk arrangement with provisions for a transfer from this bulk arrangement to a more useable condition such as an in-line arrangement.

The efficient handling of numerous cylindrical bodies such as are found in the electronic component industry is most important if one is to realize success with such a product. In the electronic industry, this handling may be associated with the manufacturer, the supplier, the user or the ultimate consumer. Presently, this handling problem is being solved through individual handling and packaging of each cylindrical body or electronic component. While the advantages of a non-individual or bulk handling concept have been recognized, a practical and workable implementation of this concept has not become a reality.

An object, then, of this invention is to provide for the transfer of cylindrical bodies from a bulk arrangement to an in-line arrangement.

A further object of this invention is to provide for transfer of cylindrical bodies from a bulk arrangement while preventing any binding between bodes within this bulk arrangement through the use of agitator means or its equivalent.

A further object of this invention is to provide for the handling of cylindrical bodies in bulk through the use of a container and removable retainer.

A still further object of this invention is to provide for the transfer of cylindrical bodies from a bulk arrangement to an in-line arrangement by means of apparatus which is compatible to bulk handling and transfer means incorporating a container or magazine with a removable retainer.

A still further object of this invention is to provide for the transfer of cylindrical bodies from bulk utilizing a bulk container construction designed to most efficiently handle those cylindrical bodies which abut the inner walls of the container.

These and other objects will become apparent from the following description and explanation based upon the illustrated embodiment of the invention. It will be understood that this illustrated embodiment is included for purposes of explanation and that the scope of the invention will be found in the appended claims.

FIGURE 1 is a side, cross-sectional view of a hopper, rail or in-line guide and agitator structure used to transfer cylindrical bodies from the bulk condition.

FIGURE 1a shows the arrangement of those cylindrical bodies immediately adjacent the hopper exit.

FIGURE 2 is a top view of the apparatus shown in FIGURE 1, but incorporating fragmented portions of the agitator while eliminating those cylindrical bodies necessary to show the construction at the point of transfer from bulk to rail.

FIGURE 3 is a partial, cross-sectional view taken along line 3—3 of FIGURE 1 to show the relationship between the inner walls of the bulk hopper and the cylindrical body.

Figure 4:
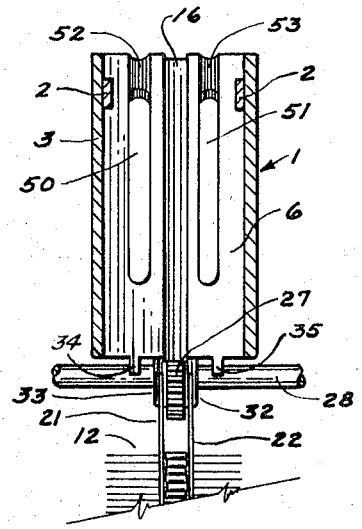
FIGURE 4 is an end, cross-sectional view taken along line 4—4 of FIGURE 1.

References to bulk or bulk arrangement herein is to be construed as cylindrical bodies which abut each other for handling in mass as opposed to isolating each body through apparatus or package.

The necessary container for handling the cylindrical bodies to which the invention is directed is illustrated by the hopper 1. At the upper portion of this hopper 1, an internally protruding ledge 2 has been constructed so as to accommodate apparatus used to transfer additional cylindrical bodies to the hopper 1. The significance of this ledge 2 will be described in more detail below.

The hopper 1 comprises side walls 3 and 4, end walls 5 and 6 and bottom wall 7 preferably inclined. Support for the bottom wall 7 is supplied by web 8 in accordance with known structural design practice.

Within the hopper 1, the cylindrical bodies, which are illustrated herein as electrical resistors and designated generally by the reference numeral 12, have a body portion 13 and leads 14 extending from either end thereof as is best seen from FIGURE 3. The latter figure further best illustrates slot 16 which is found in each of the end walls 5 and 6 as well as bottom wall 7 so as to guide those bodies 13 which abut the respective wall. It is important to note that the depth of slot 16 permits the desirable guiding feature of the bodies 13 without causing the leads 14 to touch the remaining portion of the walls 5, 6 and 7. Through this construction, minimal contact between the cylindrical bodies 12 and the hopper 1 is maintained to thereby provide the desired degree of free movement by the bodies 12. In this regard, it is pointed out that the side walls 3 and 4 are spaced so as to just clear the ends of the leads 14 and thereby provide additional guidance for the cylindrical bodies 12.

The lower ends of inclined wall 7 and end wall 6 are spaced apart so as to provide an exit for cylindrical bodies 12. Parallel plates 17 and 18 partially fill this exit and are located within groove 20 which is cut from the end of bottom wall 7, as best seen in FIGURE 2. Spaced from these plates 17 and 18 are parallel plates 21 and 22 so as to provide guide slots 23 and 24 therebetween. These guide slots establish an in-line path for the cylindrical bodies which in combination with parallel plates 17, 18, 21 and 22 form said path generally termed the rail portion or simply the rail. The plates 18 and 22 in FIGURE 1 are shown in fragmented form although actual length is a function of the distance the cylindrical bodies 12 are to be transferred by the rail.

The surfaces of parallel plates 17 and 18 which are exposed to the inside of hopper 1 are preferably inclined in the same manner as bottom wall 7. Likewise, those surfaces of parallel plates 21 and 22 which are adjacent the inside of hopper 1 are inclined at an angle similar to that of the corresponding surfaces on plates 17 and 18. An agitator, illustrated herein by gear 27, completes the opening between walls 6 and 7 at a point adjacent to the parallel plates 17, 18, 21 and 22. As is best shown in FIGURE 1, gear 27 rotates about shaft 28 which in turn is preferably centered on a line running through the lowest point in hopper 1, viz. edge 29 of plates 17 and 18 or edge 30 of plates 21 and 22. Hubs 32 and 33 locate gear 27 on shaft 28 which is connected to an external power source not shown. Additional guidance is provided those cylindrical bodies 12 coming in contact with end wall 6 through guide pins 34 and 35 extending from the lower end of end wall 6 and are best seen in FIGURE 4.

Once the cylindrical bodies 12 reach slots 23 and 24 they may be transferred to other units such as the dial 36 shown in part by FIGURE 1. Further advantage may be found in constructing knock-off 37 to be separate from the hopper 1, especially when hopper 1 is to be vibrated since separate construction maintains a constant relationship between the knock-off 37 and the agitator 27.

The operation of the invention described to this point comprises filling the hopper 1 such that the body portions 13 of cylindrical bodies 12 are stacked one immediately above the other and the leads 14 are parallel to each other. As is shown in FIGURE 2, those bodies 13 which come in contact with the walls 5, 6 or 7 will be guided by the groove 16 therein. Through gravity, vibration of the hopper 1 or other suitable means, the cylindrical bodies 12 will find their way to the exit of hopper 1 between walls 6 and 7. Those cylindrical bodies 12 which are adjacent the bottom wall 7, ride in the groove 16 until each individually reaches parallel plates 17 and 18 at which time the support for the cylindrical body 12 is transferred to leads 14. Similarly, those cylindrical bodies 12 which abut the end wall 6 make contact with this wall through groove 16 until such time as the cylindrical body drops below the groove 16 (see FIGURE 4). Depending on the type and position of the agitator 27, the leads 14 of a respective cylindrical body 12 may or may not come in contact with the guide pins 34 and 35. It should be noted that wall 7 and plates 17 and 18 may be so designed that the leads 14 do not perform a support function.

The primary purpose of the agitator, herein illustrated as gear 27, is to prevent interruption of the flow of cylindrical bodies 12 from hopper 1, which is accomplished, for example, by breaking-up the arch periodically formed by those cylindrical bodies 12 at the entrance to the slots 23 and 24. This can be illustrated by FIGURES 1 and 1a wherein those cylindrical bodies 12 which surround cylindrical body A, just entering the slots 23 and 24, viz. cylindrical bodies B, C, and D, form an arch. Often the forces between these bodies B, C, and D, caused in part by the overhead weight, establish a permanent arch and thereby prevent further feeding of the slots 23 and 24. By breaking this arch, for example by moving cylindrical body D, the path to slots 23 and 24 is kept open. The agitator in FIGURE 1 represented by gear 27 performs this necessary function by continually moving that cylindrical body 12 which assumes the D position; although it should be noted that other forms of agitators could be used such as a knurled wheel or a reciprocating arm.

Further advantage has been found in causng the cylindrical bodies 12 to arrange themselves in a particular way immediately above the slots 23 and 24. This is illustrated by the arrangement of cylindrical bodies 12 shown in FIGURE 1 and accomplished by locating the bottom wall 7 at an angle of 30 degrees to a line perpendicular to the slots 23 and 24, i.e. the angle X would be 30 degrees. The use of this particular angle for the bottom wall 7 causes the cylindrical bodies 12 to arrange themselves in rows thus reducing internal resistance between cylindrical bodies to a minimum. Moreover, this arrangement supplies rows which are parallel to the slots 23 and 24 to thereby establish a force vector immediately above slots 23 and 24 (through the weight of and gravitational pull on those cylindrical bodies 12 in this parallel run) in the desired direction of movement within the slots 23 and 24 as well as to cause a more regular pattern among the cylindrical bodies 12 at the point where objectionable binding occurs, i.e. immediately above the slots 23 and 24; to thereby establish the most desired conditions for proper functioning of the agitator or gear 27, e.g. such a regular pattern is an assurance that gear 27 will always contact the one cylindrical body 12 which when moved will eliminate the binding.

The cylindrical bodies 12 are brought to the hopper 1 in container 40 with removable retainer 41 closing the one open side of container 40. As is the case with the hopper 1, the width of container 40 is just wide enough to accommodate the cylindrical bodies 12 and thereby provide the guidance necessary.

The removable retainer 41 is preferably a fork construction with prongs 42 and 43 which abut the leads 14. Since the cylindrical bodies 12 are stacked within the container 40 in bulk form, it is important that the prongs 42 and 43 prevent the leads 14 from creeping over the edge of container 40. This is accomplished in FIGURE 5 through the use of slots 44 and 45 found in each of the prongs 42 and 43, so that the cylindrical bodies 12 within container 40 abut the prongs 42 and 43 below the edge of the open side in container 40.

To transfer the cylindrical bodies 12 from container 40 to the hopper 1 container 40 is inverted, preferably by rotating it end to end; and thereafter the container 40 is placed in the ledge 2 in the hopper 1. Initially prongs 42 and 43 fit into the hopper 1 through the slots 48 and 49 in end wall 5, which slots are open at the ledge 2 end of the hopper 1 so as to permit entry of removable retainer 41 therein without changing the relationship between the removable retainer 41, the container 40 and the cylindrical bodies 12 therein. End wall 6 includes closed slots 50 and 51 so as to accommodate the prongs 42 and 43; but immediately above slots 50 and 51 are grooves 52 and 53.

Figure 5:
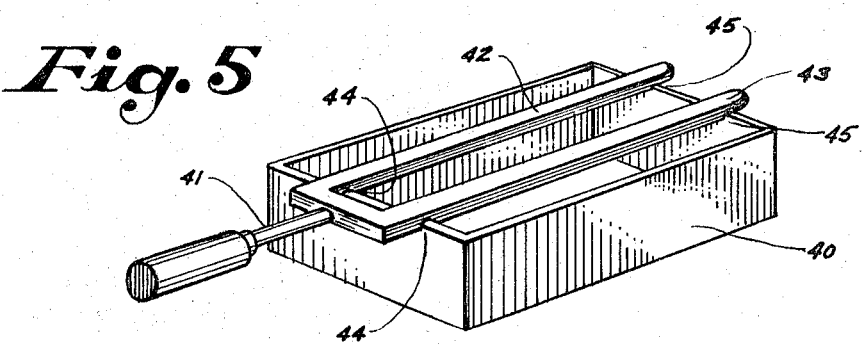
FIGURE 5 is an isometric view of a bulk container with a removable retainer located thereon in the retaining position.

Transferring the cylindrical body 12 in bulk form from the container 40 to the hopper 1 comprises inverting the container 40 from the position of FIGURE 5 after which the container 40 approaches the ledge 2 of hopper 1 at a slight angle so that ends of prongs 42 and 43 first engage the grooves 52 and 53 in the end wall 6. Using these grooves 52 and 53 for guiding purposes, the container 40 is guided into the position of FIGURE 6 while the ends of prongs 42 and 43 in the grooves 52 and 53 are slid downwardly towards the slots 50 and 51. Once the container 40 is in the FIGURE 6 position, the removable retainer 41 can be lowered to the position shown on FIGURE 6, i.e. at the bottom of the respective slots in walls 5 and 6, and then pulled out through the slots 48 and 49 in wall 5. Withdrawal of removable retainer 41, leaves the cylindrical bodies 12 free to fill the hopper 1.

Figure 6:
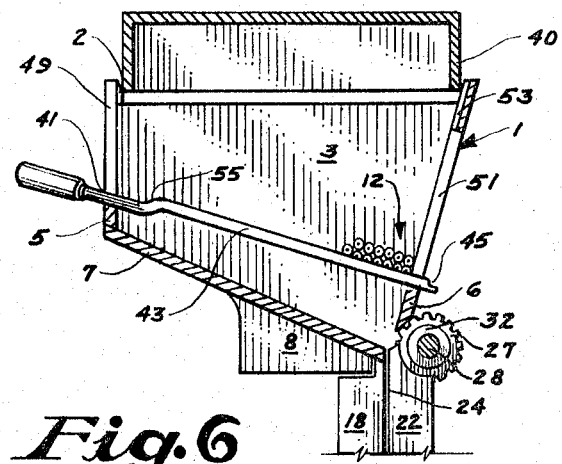
FIGURE 6 is a side, cross-sectional view taken along line 5—5 of FIGURE 2 similar to the view shown in FIGURE 1. This figure illustrates the use of the bulk container and a variation of the removable retainer of FIGURE 5 for handling and transferring these cylindrical bodies.

The removable retainer 41 in FIGURE 6 has a slight variation from that shown in FIGURE 5 in that the groove 44 is replaced by a bend in the prongs 42 and 43 at 55.

From the above description of an illustrative embodiment of the invention it will be readily seen that the invention provides a most efficient and reliable means for handling and transferring cylindrical bodies in bulk. The following claims set forth the scope of the invention.

We claim:

1. Apparatus for transferring cylindrical bodies from a bulk arrangement to an in-line arrangement comprising,
   (a) hopper means for said bodies in said bulk arrangement,
   (b) said hopper means having an open top,
   (c) said hopper means including an inclined bottom wall means with a lower end,
   (d) an exit located at said lower end,
   (e) said hopper including slot means in opposing walls,
   (f) guide means extending from said exit in which said bodies are carried away from said hopper means in said in-line arrangement,
   (g) agitator means adjacent to one side of said guide means located as to contact only those said bodies in said bulk arrangement and adjacent said guide means and thereby prevent formation of an arch therebetween, (h) container means for bringing said bodies in bulk to said hopper means at said open top and having removable retainer means for an open side therein, (i) said removable retainer means including prong means which are guided by said slot means to lower said bodies into said hopper means.

2. Apparatus for transferring electronic components in the form of cylindrical bodies including a body portion and concentric lead means of a diameter smaller than said bodies and extending therefrom from a bulk arrangement to an in-line arrangement comprising, (a) hopper means for said bodies in said bulk arrangement having side wall means spaced apart substantially the same distance as the length of said cylindrical bodies in said bulk arrangement for guidance thereof, (b) said hopper means including an inclined bottom wall means with a lower end, (c) an exit located at said lower end, (d) guide means extending from said exit means in which said bodies are carried away from said hopper means in said in-line arrangement, (e) agitator means adjacent to at least one side of said guide means located so as to contact only those said bodies in said bulk arrangement which are immediately adjacent said guide means and thereby prevent formation of an arch therebetween, and (f) said agitator means contacting only said body portion of said bodies.

3. The apparatus of claim 2 wherein said removable retainer comprises, (a) prong means which extend over said open side of said container means, (b) said prong means including means therein to cause said prong means and bodies to abut below an edge surrounding said open side, and said guide means in said hopper means comprising slots in opposing walls for said prongs.

4. The apparatus of claim 2 wherein said bottom wall includes means to guide adjacent body portions toward said agitator means.

5. The apparatus of claim 2 wherein said bottom wall means is inclined at an angle with respect to said guided in-line arrangement so that a row of bodies is formed immediately above said in-line arrangement so as to form a continuation thereof.

6. Apparatus for handling and transferring cylindrical bodies comprising, (a) container means to hold said bodies in a bulk arrangement, (b) said container means having an open side, (c) removable retainer means to retain said bodies in said container means and in said bulk arrangement when said container is rotated, (d) hopper means with an open top including means to receive and retain said container means with said open side adjacent said open top, and (e) said hopper including means to guide said removable retainer as said retainer lowers said bodies from said retained hopper means into said hopper.

7. Apparatus for handling cylindrical bodies comprising, (a) container means to hold said bodies in a bulk arrangement, (b) said container means having an open side, (c) removable retainer means to retain said bodies in said container means and in said bulk arrangement when said container is rotated, and (d) said removable retainer comprising: (1) prong means which extend over said open side of said container means, (2) said prong means including means therein to cause said prong means and said bodies to abut below an edge surrounding said open side.

References Cited by the Examiner

UNITED STATES PATENTS

| | | | |
|---|---|---|---|
| 1,099,705 | 6/1914 | Kolb | 221—201 X |
| 2,634,022 | 4/1953 | Wyatt | 221—200 |
| 2,753,062 | 7/1956 | Loudon | 214—307 |
| 3,047,193 | 7/1962 | Broderson | 221—200 X |
| 3,066,826 | 12/1962 | Ullman et al. | 221—175 |
| 3,206,065 | 9/1965 | Netta | 221—201 |

HUGO O. SCHULZ, *Primary Examiner.*